(12) United States Patent
Fusseder

(10) Patent No.: US 6,932,927 B2
(45) Date of Patent: Aug. 23, 2005

(54) METHOD FOR PRODUCING A PLASTIC COMPOSITE ELEMENT

(75) Inventor: Josef Fusseder, Bodenkirchen (DE)

(73) Assignee: Lear Corporation, Southfield, MI (US)

( * ) Notice: Subject to any disclaimer, the term of this patent is extended or adjusted under 35 U.S.C. 154(b) by 225 days.

(21) Appl. No.: 10/204,677

(22) PCT Filed: Feb. 22, 2001

(86) PCT No.: PCT/EP01/01994
§ 371 (c)(1),
(2), (4) Date: Nov. 7, 2002

(87) PCT Pub. No.: WO01/62465
PCT Pub. Date: Aug. 30, 2001

(65) Prior Publication Data
US 2003/0143385 A1 Jul. 31, 2003

(30) Foreign Application Priority Data
Feb. 24, 2000 (DE) .......................................... 100 08 775

(51) Int. Cl.⁷ .............................................. B29C 44/06
(52) U.S. Cl. .................... 264/46.4; 264/46.6; 264/46.8; 264/255; 264/320
(58) Field of Search .............................. 264/45.1, 46.4, 264/46.6, 46.8, 255, 320

(56) References Cited
U.S. PATENT DOCUMENTS 3,989,781 A * 11/1976 Chant .......................... 264/46.4
4,287,143 A * 9/1981 Sears et al. .................. 264/46.8
4,544,126 A * 10/1985 Melchert ...................... 249/83
4,975,229 A * 12/1990 Kita et al. ................... 264/45.2

FOREIGN PATENT DOCUMENTS

| DE | 3924254 A1 | 2/1990 |
| GB | 2 221 183 A | 1/1990 |
| GB | 2 306 910 A | 5/1997 |

OTHER PUBLICATIONS

Abstract of JP 03133624.*

* cited by examiner

Primary Examiner—Allan R. Kuhns
(74) Attorney, Agent, or Firm—Brooks Kushman P.C.

(57) ABSTRACT

The present invention relates to a method for producing a plastic composite element (1), in particular as an interior lining element for a motor vehicle, with an outer covering (2) being lined with a foamable plastic, characterized in that the outer covering (2) is lined at least partially with a flexible foam (3), that the flexible foam (3) is subsequently lined with a rigid foam (5) with a separating means being placed thereinbetween, and that a shaped part (4) which can be prefabricated is used as the separating means which by virtue of the mechanical properties of its material and/or its shape prevents the rigid foam (5) from penetrating the flexible foam (3) and/or prevents a deformation of the outer covering (2), and such a plastic composite element (2).

15 Claims, 2 Drawing Sheets

METHOD FOR PRODUCING A PLASTIC COMPOSITE ELEMENT

Figure 1:
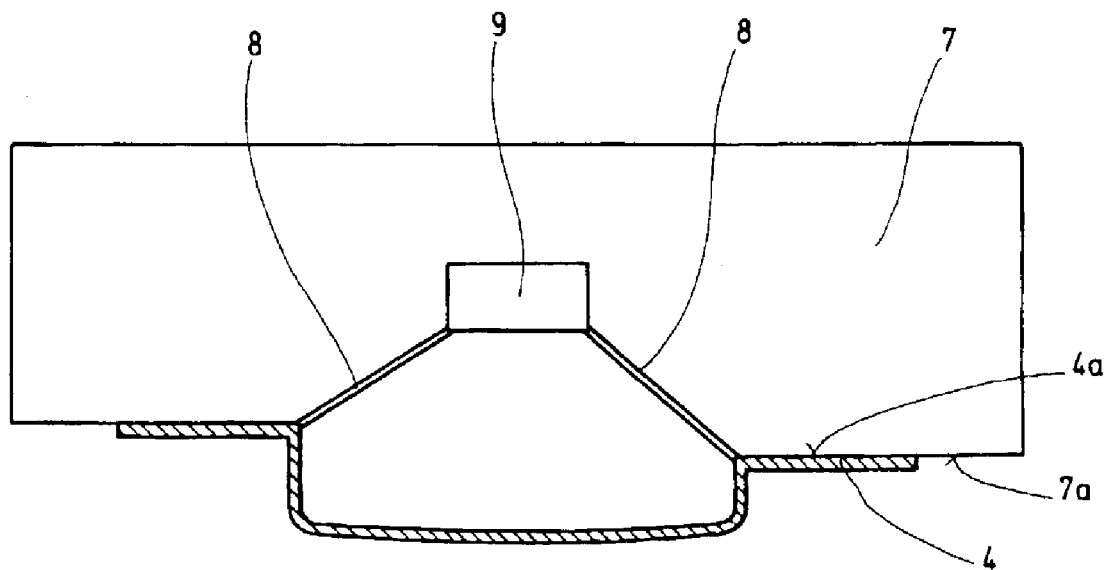
Figure 1:
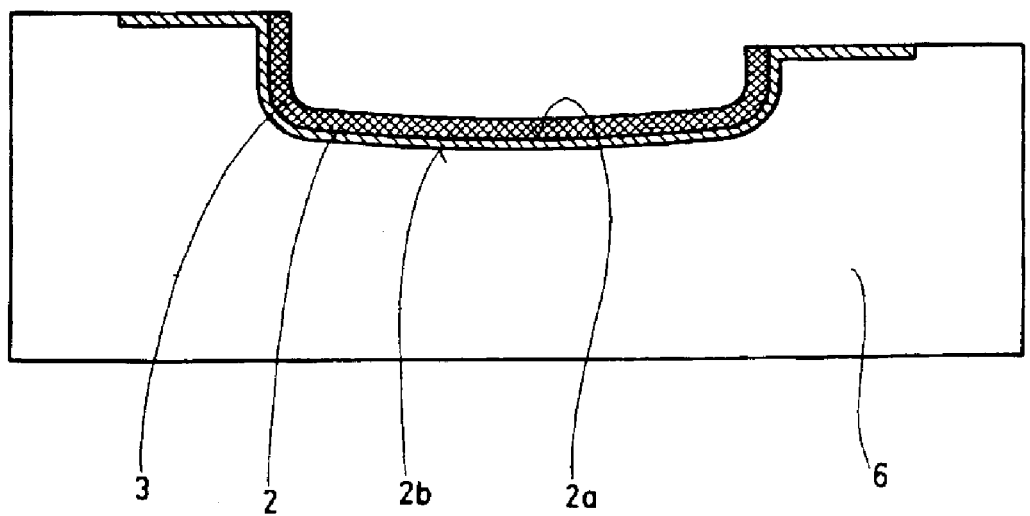

The present invention relates to a method for producing a plastic composite element, in particular an interior lining element for a motor vehicle, according to the preamble of claim 1, and such a plastic composite element.

Known are methods for producing a plastic composite element wherein an outer covering is lined with a foamable plastic. When a correspondingly rigid foam is used, a further area, for instance an interior trim for a vehicular door, can be shaped simultaneously with the lining and connected to the outer covering. Further decoration elements or e.g. loudspeakers of an audio system can be mounted on the rigid foam. The rigidity of the rigid foam required in this connection is however inconsistent with the high demands made on comfort and/or safety, which necessitate—at least in specific areas of the composite element—a soft touch and/or a resilience.

U.S. Pat. No. 5,851,457 discloses a method according to the preamble of claim 1 for producing a seat cushion. A layer of the covering unit is here pressed into a lower mold by the action of a vacuum, and the back side thereof is then foamed with a plastic material to form a foam core. The specific weight of the foam core is 40 to 60 kg/m$^3$, corresponding to 0.04 to 0.06 g/cm$^3$. The layered covering unit consists of the cushion slip, a breathable foam mat, an air-impermeable barrier layer and an insulating undercoat.

It is the object of the present invention to provide a method for producing a plastic composite element and a corresponding plastic composite element which overcomes the drawbacks of the prior art, in particular, with which a plastic composite element can be produced at low costs that satisfies all demands made on comfort and/or safety.

A sandwich structure of outer covering/flexible foam/rigid foam would be desirable in particular in specific areas of the interior trim of a motor vehicle. During foaming of the rigid foam in the foam mold, however, compressive stresses arise in the rigid foam that are so high that the flexible foam is deformed and that, when the composite element is removed from the mold, the outer covering and thus the contour, texture, relief and/or decoration of the outer covering are deformed. The invention is therefore to realize, in particular, a sandwich structure consisting of outer covering/flexible foam/rigid foam without a deformation of the outer covering impairing the function and/or esthetics of the composite element.

The object is achieved by the method and the composite element defined in the independent patent claims. Special embodiments of the invention are defined in the subclaims.

The object is achieved by a method for producing a plastic composite element, in particular an interior lining element for a motor vehicle, wherein an outer covering is lined at least partially with a flexible foam which is subsequently lined with a rigid foam with a separating means being placed therebetween, a shaped part which can be prefabricated being used as the separating means which by virtue of the mechanical properties of its material and/or its shape prevents the rigid foam from penetrating the flexible foam and/or prevents a deformation of the outer covering.

The use of the term flexible foam is to be understood as a distinction over the rigid foam which is also to be applied, and is to express that the flexible foam is more flexible than the rigid foam. Therefore, the flexible foam according to claim 1 also includes so-called semi-rigid foams, such as polyurethane foams having a specific weight of e.g. 0.11 to 1.18 g/m$^3$. The rigidity of the flexible foam can be adjusted by the mixing ratio of the components, which are normally two, and can be adapted to the demands made on the comfort and/or safety of the respective application, in particular in consideration of the shape of the composite element, the thickness of the flexible foam and/or the thickness and rigidity of the rigid foam.

The outer covering may consist of a plastic material, e.g. a deep-drawn polyvinyl chloride (PVC), and comprise a relief and/or decoration on the visible surface. Typical reliefs are e.g. grained imitation leathers. The outer covering may be a shaped part which can be prefabricated accordingly.

The separating means between flexible and rigid foam can preferably be produced by deep drawing, deep-drawn parts of plastics being particularly suited for reasons of costs, e.g. parts made of acrylic butadiene styrene (ABS), polyvinyl chloride (PVC) or polystyrene (PS). The initial thickness of the shaped part used as the separating means is e.g. between 0.1 and 0.7 mm, depending on the material used and the shape. A thickness preferred for e.g. for ABS and a standard shape is 0.3 mm. The separating means prevents a change which is detrimental to esthetics, haptics, shape and/or safety and arises in the flexible foam and/or the outer covering or the composite element due to the compressive stresses arising during the back-foaming with rigid foam and possibly becoming visible upon removal of the composite element from the mold.

For lining purposes the outer covering is placed into a correspondingly formed lower mold and the flexible foam material which forms the flexible foam is then applied to the back side of the outer covering. Depending on the temperature of the flexible foam material, the shape and the environment, it will take some time, normally a few seconds, until a foaming and thus, an increase in volume of the flexible foam material occurs. Prior to or during foaming of the flexible foam material the shaped part is brought into contact with the flexible foam material. To this end it is preferably mounted on a correspondingly shaped upper mold and held in the upper mold, for instance by vacuum application at the back side, locking or clamping.

Upon contact of the shaped part with the flexible foam material the shaped part is brought—preferably in the edge portion thereof—into contact with the outer covering and is connected e.g. by exiting flexible foam material with said material such that a penetration of rigid foam during subsequent lining with rigid foam is prevented. Preferably, the shaped part is shaped such that a planar or linear contact or a positive connection with the outer covering is obtained in the edge portion of said shaped part.

The costs for the plastic composite element according to the invention can be reduced further when the outer covering is also a deep-drawn part which can be prefabricated. Almost any reliefs or decorations can thereby be realized in a simple and reproducible way and will survive the foaming process with rigid foam without any damage.

Further advantages, features and details of the invention will become apparent from the subclaims and the following description in which one embodiment is described in detail with reference to the drawings. The features indicated in the claims and in the description can each be essential for the invention, taken either individually or in any desired combination.

Figure 2:
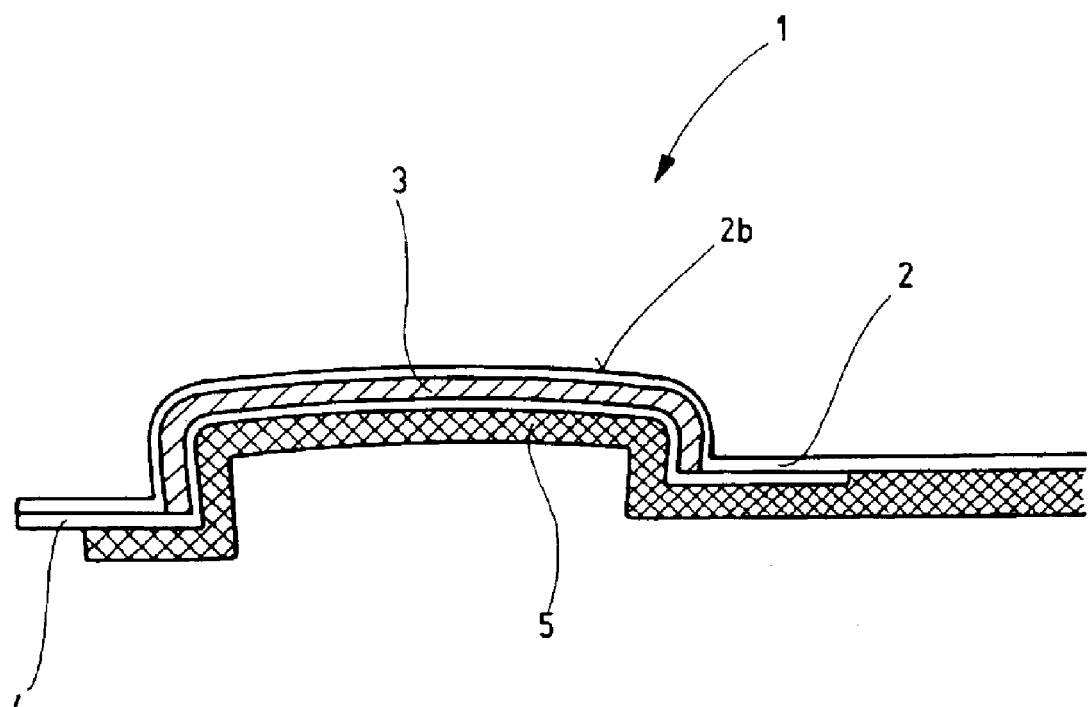

FIG. 1 shows a detail of the production of a plastic composite element according to the invention; and FIG. 2 shows a cross section through a plastic composite element according to the invention.

FIG. 1 shows a detail of the production of a plastic composite element 1 according to the invention, namely the lining of the outer covering 2 with a flexible foam 3 and the application of a shaped part 4 as a separating means between the flexible foam 3 and the rigid foam 5 to be applied subsequently. To this end a predeterminable amount of the flexible foam material which after foaming yields a PU semi-rigid foam with a specific weight between 0.11 and 0.18 g/cm$^3$ is applied to the back side 2a of the outer covering 2 which is put into a lower mold 6 and has previously been produced as a deep-drawn part from PVC, possibly by using the illustrated lower mold 6, and which is provided on its surface 2b with a decoration and/or a relief.

Subsequently, the upper mold 7, including the mounted shaped part 4 which has been produced by deep drawing from an ABS plastic material with an initial thickness adapted to the mechanical properties required, and the lower mold 6 are joined, i.e. as long as the flexible foam 3 is foaming and still deformable. At a temperature of the lower and upper molds 6, 7 of e.g. about 45° C. and a suitable flexible foam material, the foaming process starts and thus the increase in volume of the flexible foam material after about 10 to 12 seconds after application to the outer covering 2. Lower and upper molds 6, 7 remain closed until the complete hardening of the flexible foam 3. After the mold has been opened, the composite of outer covering 2/flexible foam 3/shaped part 4 is lined in a further step of the method with a rigid foam 5.

In the illustrated embodiment the shaped part 4 is fixed by vacuum application at the back side to the upper mold 7 which to this end comprises connection channels 8 between a vacuum chamber 9, which can be brought into operative communication with a vacuum pump (not shown) and can be aerated, if necessary, and the mold surface 7a of the upper mold 7 which is oriented towards the back side 4a of the shaped part 4. Alternatively or in addition, the shaped part 4 can also be fixed by clamping or locking to the upper mold 7.

FIG. 2 is a cross-sectional view showing a plastic composite element 1 according to the invention. This is in particular an element of an interior trim for a door of a motor vehicle. The outer covering 2 has been prefabricated by deep drawing. On its surface 2b directed to the interior of the motor vehicle, it comprises a leather-like texture or graining. In an area of the interior trim of the door which forms a ledge of the door window, the outer covering is lined with the flexible foam 3. The hardness of the flexible foam 3 and the thickness of the flexible foam layer are adapted to the respective application, in particular to the demands made on comfort and/or security.

The flexible foam 3 is lined with the rigid foam 5 with intermediate placement of the shaped part 4 which has also been prefabricated by deep drawing and consists of an ABS plastic material having an initial thickness of 0.3 mm. The shaped part 4 is connected on its edge portions in planar contact with the outer covering 2 and by the flexible foam 3 to said covering, so that the rigid foam 5 is reliably prevented from penetrating the area of the flexible foam 3 between the outer covering 2 and the shaped part 4. Outside the shaped part 4 and in particular in an area in which the demands made on comfort and/or safety do not require a flexible foam 3, the rigid foam 5 can come into direct contact with the outer covering 2 and directly line said covering.

What is claimed is:

1. A method for producing a plastic composite element (1) as an interior lining element for a motor vehicle, with an outer covering (2) being lined with a foamable plastic, characterized in that said outer covering (2) is lined at least partially with a flexible foam (3), that said flexible foam (3) is subsequently lined with a rigid foam (5), with a separating means being placed thereinbetween, and that a shaped part (4) which can be prefabricated is used as said separating means which by virtue of the mechanical properties of its material and/or its shape prevents said rigid foam (5) from penetrating said flexible foam (3) and/or prevents a deformation of said outer covering (2) and wherein a portion of said shaped part (4) contacts said outer covering (2) and is connected thereto.

2. The method according to claim 1, characterized in that said shaped part (4) is produced by deep drawing.

3. The method according to claim 2, characterized in that said shaped part (4) is made of acrylic butadiene styrene, polyvinyl chloride or polystyrene with an initial thickness of 0.1 to 0.7 mm.

4. The method according to claim 1 wherein during lining of said outer covering (2), a flexible foam material forming said flexible foam (3) is applied to a back side (2a) of said outer covering (2) which is laid into a lower mold (6) and subsequently, before or during foaming of said flexible foam material, said shaped part (4) which is mounted on an upper mold (7) is brought into contact with said flexible foam material.

5. The method according to claim 1 wherein said shaped part (4) includes an edge portion that is brought into a contact with said outer covering (2) and connected thereto.

6. The method according to claim 1 wherein said flexible foam (3) is a polyurethane foam having a specific weight from 0.11 to 0.18 g/cm$^3$.

7. The method according to claim 2 wherein during lining of said outer covering (2), a flexible foam material forming said flexible foam (3) is applied to a back side (2a) of said outer covering (2) which is laid into a lower mold (6) and subsequently, before or during foaming of said flexible foam material, said shaped part (4) which is mounted on an upper mold (7) is brought into contact with said flexible foam material.

8. The method according to claim 3 wherein during lining of said outer covering (2), a flexible foam material forming said flexible foam (3) is applied to a back side (2a) of said outer covering (2) which is laid into a lower mold (6) and subsequently, before or during foaming of said flexible foam material, said shaped part (4) which is mounted on an upper mold (7) is brought into contact with said flexible foam material.

9. The method according to claim 2 wherein said shaped part (4) includes an edge portion that is brought to contact with said outer covering (2) and connected thereto.

10. The method according to claim 3 wherein said shaped part (4) includes an edge portion that is brought into contact with said outer covering (2) and connected thereto.

11. The method according to claim 4 wherein said shaped part (4) includes an edge portion that brought into contact with said outer covering (2) and connected thereto.

12. The method according to claim 2 wherein said flexible foam (3) is a polyurethane foam having a specific weight from 0.11 to 0.18 g/cm$^3$.

13. The method according to claim 3 wherein said flexible foam (3) is a polyurethane foam having a specific weight from 0.11 to 0.18 g/cm$^3$.

14. The method according to claim 4 wherein said flexible foam (3) is a polyurethane foam having a specific weight from 0.11 to 0.18 g/cm$^3$.

15. The method according to claim 5 wherein said flexible foam (3) is a polyurethane foam having a specific weight from 0.11 to 0.18 g/cm$^3$.

* * * * *